March 1, 1932. H. D. HOEKSTRA ET AL 1,848,013
AIRCRAFT CONTROL SURFACE CONTROL
Filed April 9, 1930

INVENTOR.
Harold D. Hoekstra
Evart C. Hokanson
BY
Allen Allen
ATTORNEYS

Patented Mar. 1, 1932

1,848,013

UNITED STATES PATENT OFFICE

HAROLD D. HOEKSTRA AND EVERT C. HOKANSON, OF GLENDALE, OHIO, ASSIGNORS TO POWEL CROSLEY, JR., OF CINCINNATI, OHIO

AIRCRAFT CONTROL SURFACE CONTROL

Application filed April 9, 1930. Serial No. 442,838.

Our invention relates to aileron elevator and rudder controls for airplanes which are broadly referred to as control surface controls.

Aircraft control surfaces have in the past been operated by a cable and horn, push tube and horn, or by a torque member having its center line of rotation coincident with a continuation of the aileron hinge line. Disadvantages of such methods of control are that excessive play is allowed which tends toward a fluttering in the control surface and with wear of the controlling mechcanism it becomes difficult to cleanly close the gap between the stationary and movable surfaces. Further, controlling mechanism which is external tends to build up air resistance in the air stream, which is undesirable from the point of view of the efficiency of the mechanism.

It is the object of our invention to provide improvements in control surface controls in which the operating mechanism is within the stationary member or wing, thus reducing the air resistance in the air stream. It is a further object of our invention to allow the use of a control surface having torsional rigidity, permitting efficient use of the cover material.

Another object is the provision of controlling mechanism which permits differential motion of the control surface.

The above objects and other objects to which reference will be made in the ensuing disclosure, we accomplish by that certain combination and arrangement of parts of which we have illustrated a preferred embodiment.

In the drawings:—

Figure 1:
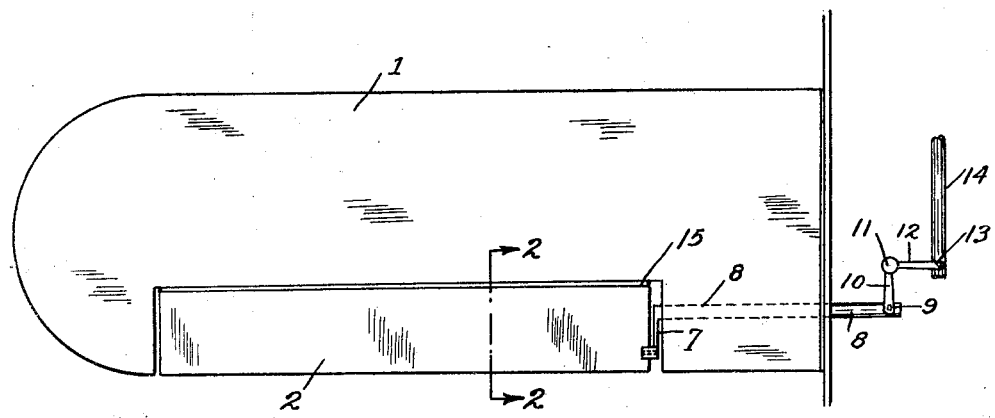
Figure 1 is a plan view of the control mechanism applied to the aileron of an aircraft.
Figure 2:
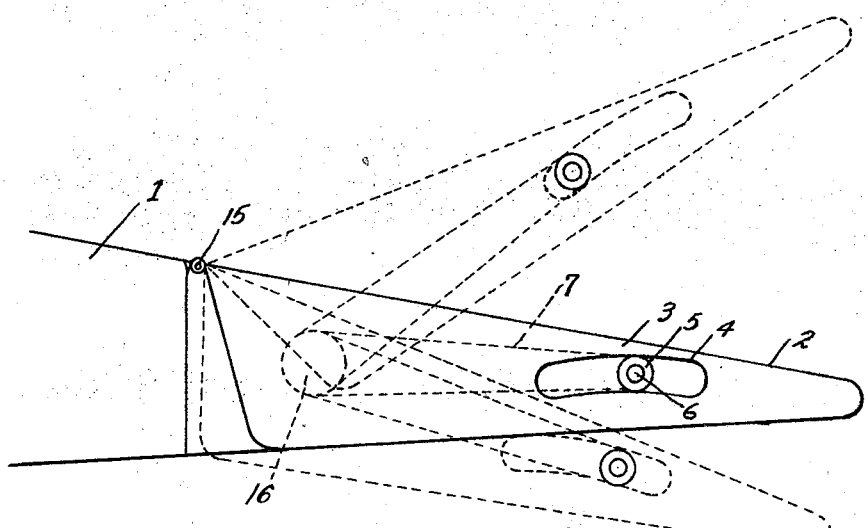
Figure 2 is an end view, taken along the lines 2—2 of Figure 1, showing diagrammatically the mechanical principle involved in our preferred control mechanism.
Figure 3:
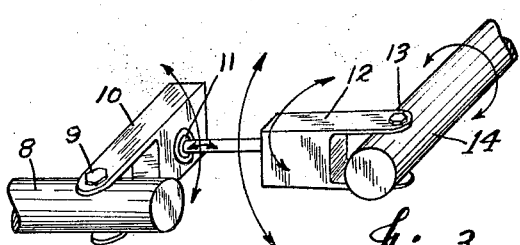
Figure 3 is a perspective view of the connection between the torque member and the main control shaft.

As indicated in the figures, the airplane wing is indicated at 1 and the aileron is indicated at 2. We have indicated at 3 the inner end of the control surface member or aileron, which is provided with a slot 4 within which is seated a roller 5 mounted on a shaft 6 secured in the end of a crank arm 7 which extends from the torque rod 8.

We have connected with a pivot connection 9 an arm 10 to the rod 8. In the arm 10 is a joint which connects the arm 10 with the arm 12. The arm 12 has a pivot 13 with the aileron control tube 14 which extends to the pilot's driving position and is suitably connected with the stick.

The arm 10 is connected with the arm 12, as noted, with the joint 11, which may be a ball and socket joint, a universal joint, or a self-aligning ball bearing. The arm 12 is attached to the control member 14 by means of a pivot, the center line of rotation of which is substantially perpendicular to, but not necessarily intersecting the center line of rotation of the control member.

The aileron hinge line is indicated at 15, and it will be noted that a continuation of the hinge line of the aileron does not intercept the hinge or pivot line 16 of the axis of the torque member 8. Since the hinge line 15 is at the top surface of the wing, if the torque member of the controlling mechanism operated on a continuation of this line the control mechanism would necessarily be exposed and cause air resistance, but since the hinge line of the torque member 8 is eccentric to the hinge line of the aileron, all this mechanism may be enclosed within the wing structure.

Differential action of the surfaces may be obtained by proper curvature of the slot 4 and/or positioning of the arms 10 and 12 with respect to the torque members 8 and 14.

Since the control surface need not be an aileron, as the construction shown is equally useful for controlling an elevator or rudder, in the claims we shall refer to the control surface as being hinged to a stationary member, be this the wing or other stationary part of the aeroplane body.

Having thus described our invention, what we claim as new and desire to secure by Letters Patent, is:—

1. In combination with a control surface in an airplane, mechanical means for controlling said surface comprising a torque member having a crank arm having a sliding connection with said surface, said surface being hinged to a wing of the airplane, and the axis of the torque member being substantially parallel and offset relative to the hinge line of said surface, said airplane having a wing within which said torque member extends.

2. In combination with a control surface in an airplane, mechanical means for controlling said surface comprising a torque member having a crank arm having a sliding connection with said surface, said surface being hinged to a wing of the airplane, and the axis of the torque member being parallel and offset relative to the hinge line of said surface, a control member and pivoted arms connecting said torque member and said control member having a joint between said pivoted arms.

3. In combination with a stationary member of an airplane having a control surface hinged thereon, control mechanism for actuating said control surface comprising a torque member axially disaligned from the hinge line of said surface, said surface having a slot in one end thereof, and said torque member having a member slidably mounted in said slot, said member comprising a roller mounted in axial parallel alignment with said torque member on a crank extending from said torque member.

4. In combination with the wing a stationary member of an airplane having a control surface hinged thereon, control mechanism for actuating said control surface comprising a torque member having a crank arm extending therefrom, and said crank arm having a cam slot and cam rider connection with said control surface, said control surface having a stiffened end wall having said cam slot formed therein.

5. In combination with a stationary member of an airplane having a control surface hinged thereon, control mechanism for actuating said control surface comprising a torque member having a crank arm extending therefrom, and said crank arm having a cam slot and cam rider connection with said control surface, said control surface having a stiffened end wall having said cam slot formed therein, and said cam rider comprising a roller mounted on and extending at right angles to the end of said crank.

HAROLD D. HOEKSTRA.
EVERT C. HOKANSON.